US006721505B2

(12) United States Patent
Talbot

(10) Patent No.: US 6,721,505 B2
(45) Date of Patent: Apr. 13, 2004

(54) WDM RING TRANSMISSION SYSTEM

(75) Inventor: William E. Talbot, Columbia, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 10/457,407

(22) Filed: Jun. 10, 2003

(65) Prior Publication Data

US 2003/0198472 A1 Oct. 23, 2003

Related U.S. Application Data

(62) Division of application No. 09/066,921, filed on Apr. 27, 1998.

(51) Int. Cl.[7] ............................ H04B 10/20; H04J 14/02
(52) U.S. Cl. ........................................ 398/59; 398/83
(58) Field of Search ................... 398/47, 59, 74, 398/75, 83

(56) References Cited

U.S. PATENT DOCUMENTS

| 5,442,623 A | 8/1995 | Wu ............................ 370/16.1 |
| 5,510,923 A | 4/1996 | Philippe et al. ............. 359/137 |
| 5,550,818 A | 8/1996 | Brackett et al. .............. 370/60 |
| 5,576,875 A | 11/1996 | Chawki et al. ............. 359/125 |
| 5,717,795 A | 2/1998 | Sharma et al. ................ 385/24 |
| 5,903,371 A | 5/1999 | Arecco et al. .............. 359/124 |
| 5,930,016 A | 7/1999 | Brorson et al. ............. 359/127 |
| 5,943,150 A | 8/1999 | Deri et al. .................. 359/133 |
| 5,986,783 A | 11/1999 | Sharma et al. ............. 359/119 |
| 6,002,503 A | 12/1999 | Mizrahi ...................... 359/124 |
| 6,040,933 A | 3/2000 | Khaleghi et al. ........... 359/124 |
| 6,046,833 A | 4/2000 | Sharma et al. .............. 359/119 |
| 6,125,118 A | 9/2000 | Arnold ....................... 370/397 |
| 6,141,125 A | 10/2000 | Blair et al. ................. 359/110 |
| 6,233,077 B1 | 5/2001 | Alexander et al. .......... 359/133 |

FOREIGN PATENT DOCUMENTS

| EP | 0717521 | 6/1996 | ............ H04J/14/02 |
| EP | 0763909 | 3/1997 | ......... H04B/10/213 |
| WO | WO 9508247 | 3/1995 | |
| WO | WO 9940700 | 12/1999 | |

OTHER PUBLICATIONS

Johansson, S., "Transparent Optical Multicarrier Networks", Proceedings of the European Conference on Optical Communication, vol. 2, No. CONF. 18, 1992.

Primary Examiner—Leslie Pascal
Assistant Examiner—Dalzid Singh
(74) Attorney, Agent, or Firm—Michael R. Cammarata; David L. Soltz

(57) ABSTRACT

An optical fiber ring is provided carrying a plurality of WDM optical signals, each at a respective one of a plurality of wavelengths. Each optical signal carries data associated with a corresponding group of TDM add/drop multiplexers coupled to an optical path spaced from the optical fiber ring. The optical signals are extracted from the fiber ring with optical add/drop multiplexers, and the data carried by the optical signals is then supplied to the corresponding group of TDM add/drop multiplexers. Accordingly, instead of assigning an optical add/drop multiplexer to each TDM add/drop multiplexer, the optical add/drop multiplexers are assigned to respective groups of TDM add/drop multiplexers. As a result, optical loss as well as cost of the WDM ring are minimized.

10 Claims, 5 Drawing Sheets

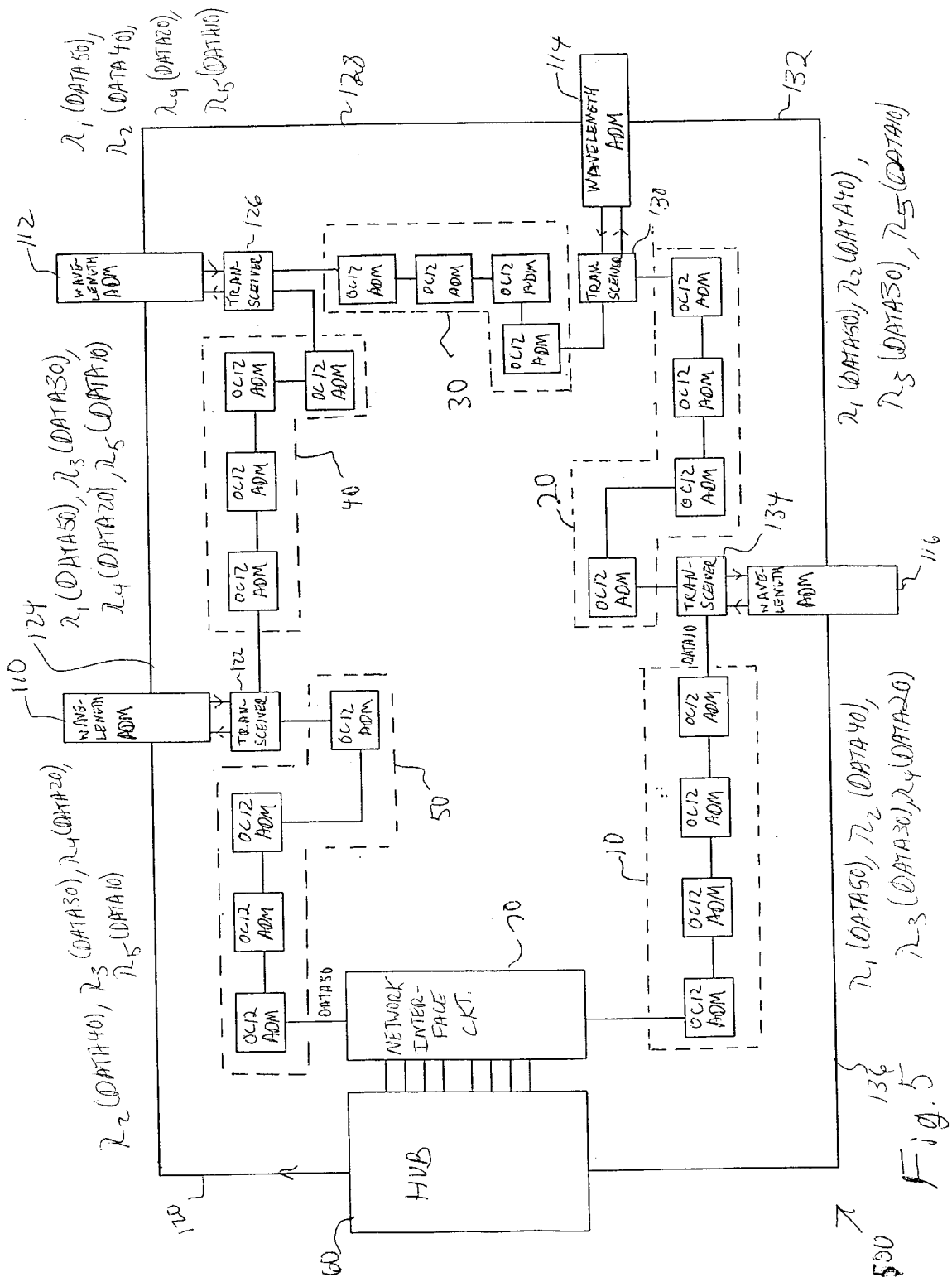

WDM RING TRANSMISSION SYSTEM

This application is a divisional of co-pending application Ser. No. 09/066,921, filed on Apr. 27, 1998.

BACKGROUND OF THE INVENTION

The present invention is directed toward a wavelength division multiplexed (WDM) ring transmission system.

Wavelength division multiplexing (WDM) is being explored as an approach for economically increasing the capacity of existing fiber optic networks. WDM systems typically include a plurality of transmitters, each respectively transmitting signals on a designated wavelength or channel. As a result, fiber capacity can be increased by a multiple equal to the number of channels.

WDM systems have been deployed in long distance networks in a point-to-point configuration consisting of end terminals spaced from each other by one or more segments of optical fiber. In metropolitan areas, however, WDM systems having a ring or loop configuration are currently being developed. Such systems typically include a plurality of nodes located along the ring. At least one optical add/drop multiplexer, associated with each node, is typically connected to the ring. The optical add/drop element permits both addition and extraction of channels to and from the ring. One of the nodes, referred to as a hub or central office node, typically has a plurality of associated add/drop elements for transmitting and receiving a corresponding plurality of channels to/from other nodes along the ring.

Each optical signal in a WDM system is typically transmitted at a unique wavelength. Conventional filters, such as dielectric filters, can be provided within the add/drop elements in order to facilitate adding and/or dropping of individual channels, while allowing the remaining optical signals to continue along the ring. Each filter and its associated optical connectors, however, imposes an incremental loss on optical signals propagating along the WDM ring. Accordingly, a limited number of optical add/drop elements are typically coupled to the WDM ring in order to minimize loss. Moreover, the cost of each optical add/drop element can be relatively high. Thus, the number of optical add/drop elements coupled to the WDM ring is restricted for economic reasons as well.

Currently, single wavelength time division multiplexed (TDM) rings have been deployed in many metropolitan areas. In these systems, TDM add/drop multiplexers (e.g., synchronous optical network or SONET add/drop multiplexers) assign a particular time slot to each signal source, so that a single complete signal is constructed from portions of the signal collected from each time slot. While this is a useful technique for carrying plural information sources on a single channel, it is prohibitively expensive to continue to increase the TDM data rate. Thus, numerous fiber rings have been deployed, each respectively coupled to a group of TDM add/drop multiplexers.

In order to increase the bandwidth or capacity of such TDM networks, it would be advantageous to couple a plurality of TDM add/drop multiplexers to a single fiber ring by assigning each TDM add/drop multiplexer a particular WDM wavelength which, in turn, could be added and dropped from the ring by a corresponding optical add/drop multiplexer. As noted above, however, the loss and expense associated with each optical add/drop multiplexer limits the number optical add/drop multiplexers. Accordingly, the number of TDM add/drop multiplexers which can be coupled to a WDM ring with optical add/drop multiplexers is similarly restricted.

SUMMARY OF THE INVENTION

Consistent with the present invention, an optical communication apparatus is provided which comprises a first plurality of optical communication path segments interconnected in a first loop. The first plurality of optical communication path segments carry a plurality of optical signals, each of which being at a respective one of a plurality of wavelengths. The communication apparatus further comprises a plurality of optical communication path segments. Groups of add/drop multiplexers are coupled to a respective one of the plurality of optical communication path segments, and each of the plurality of optical signals carries data associated with a corresponding group of add/drop multiplexers.

BRIEF DESCRIPTION OF THE DRAWINGS

Advantages of the present invention will be apparent from the following detailed description of the presently preferred embodiments thereof, which description should be considered in conjunction with the accompanying drawings in which:

FIG. 5 illustrates a WDM ring transmission system in accordance with a second embodiment of the present invention.

DETAILED DESCRIPTION

In accordance with the present invention, an optical fiber ring is provided carrying a plurality of WDM optical signals, each at a respective one of a plurality of wavelengths. Each optical signal carries data associated with a corresponding group of TDM add/drop multiplexers coupled to an optical path spaced from the optical fiber ring. The optical signals are extracted from the fiber ring with optical add/drop multiplexers, and the data carried by the optical signals is then supplied to the corresponding group of TDM add/drop multiplexers. Accordingly, instead of assigning an optical add/drop multiplexer to each TDM add/drop multiplexer, the optical add/drop multiplexers are assigned to respective groups of TDM add/drop multiplexers. As a result, optical loss as well as cost of the WDM ring are minimized.

Figure 1:
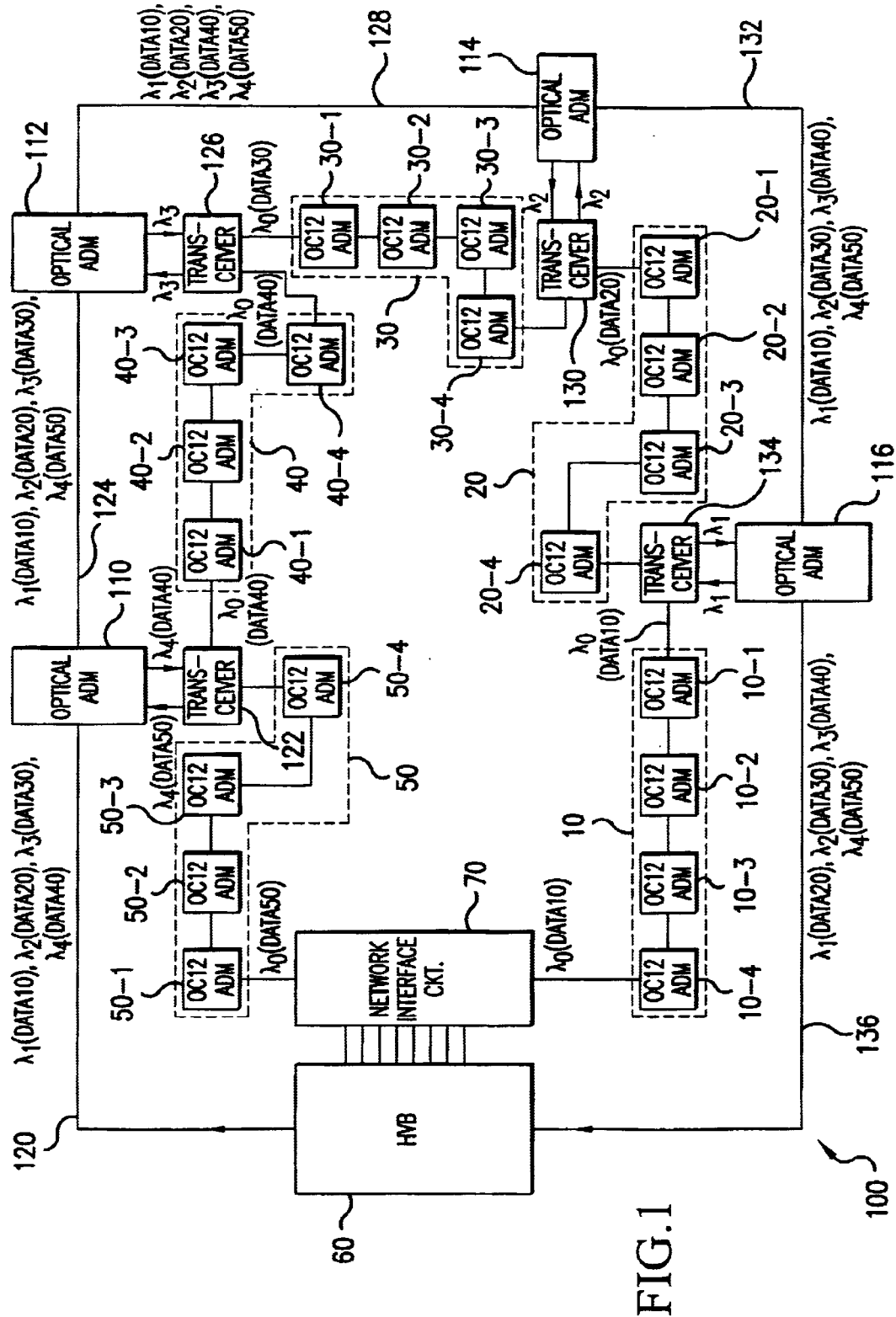
FIG. 1 illustrates a WDM ring transmission system in accordance with a first embodiment of the present invention.

Turning to the drawings in which like reference characters indicate the same or similar elements in each of the several views, FIG. 1 illustrates a schematic diagram of a WDM ring transmission system 100 in accordance with a first embodiment of the present invention exchanges data with an external network (not shown) via hub 60 and network interface circuit 70. Hub 60, also described in U.S. patent application Ser. No. 09/006,586, incorporated by reference herein, comprises a plurality of optical add/drop multiplexers for adding and extracting optical signals at wavelengths $\lambda_1$-$\lambda_4$ supplied from network interface circuit 70. Each optical signal carries data associated with a corresponding group of TDM add/drop multiplexers coupled to a respective one of optical communication path segments 10, 20, 30, 40 and 50, to be described in greater detail below. The optical signals are added and extracted along WDM ring transmission system 100 by a respective one of a plurality of transfer elements such as optical add/drop multiplexers 110, 112, 114 and 116.

Figure 2:
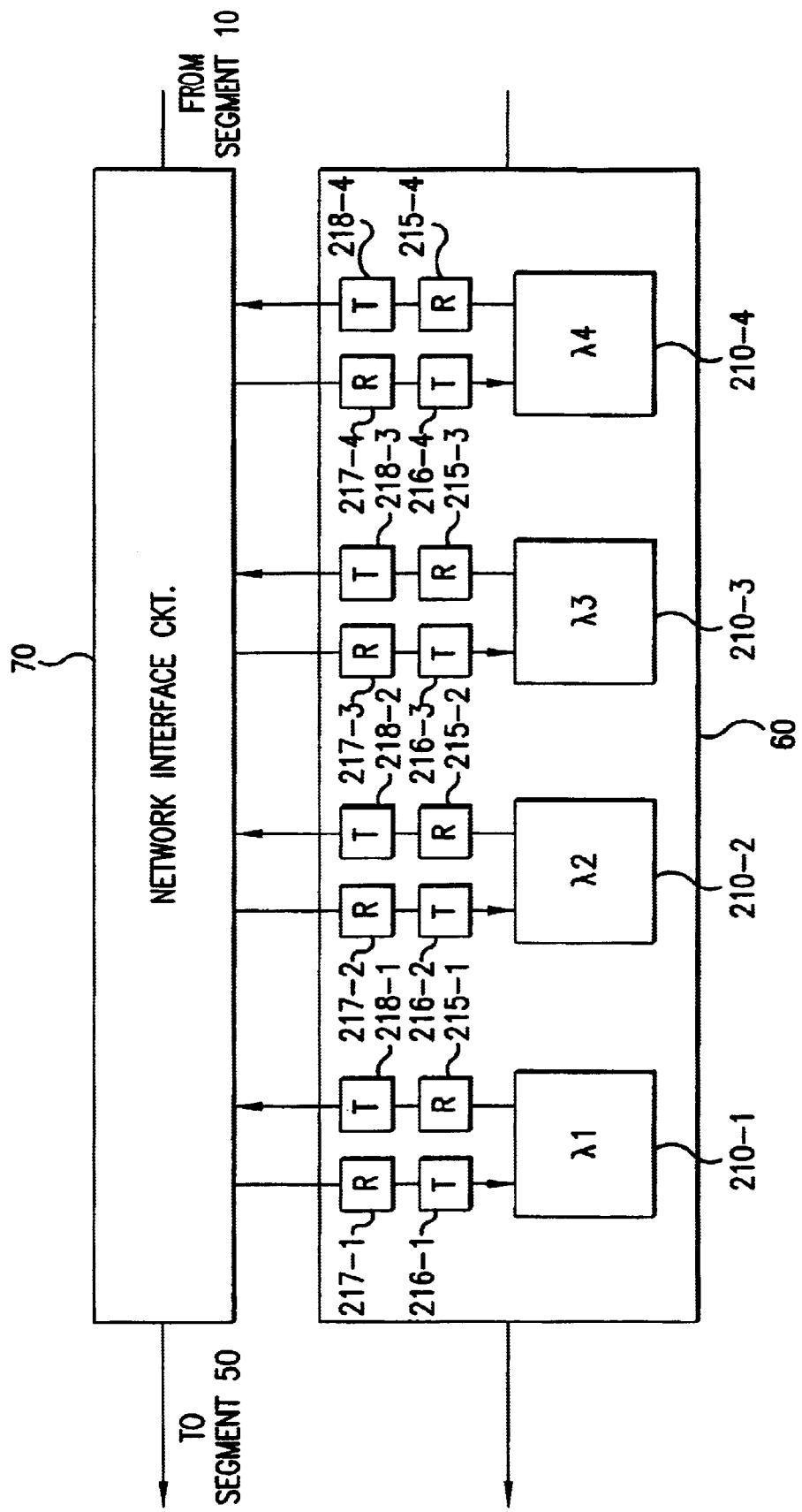
FIG. 2 illustrates a hub.

As shown in FIG. 2, hub 60 includes a plurality of optical add/drop multiplexers 210-1 to 210-4, each of which respectively adding and extracting one of wavelengths $\lambda_{1-4}$. Each of optical add/drop multiplexer 210-1 to 210-4 has a construction similar to that shown in FIG. 3, discussed in greater detail below. Optical add/drop multiplexers 210-1 to 210-4 have input ports respectively connected to transmitters 216-1 to 216-4, each comprising one of a directly modulated laser and an externally modulated laser emitting modulated optical signals at a respective one of wavelengths $\lambda_1$–$\lambda_4$, and output ports respectively connected to a corresponding one of receivers 215-1 to 215-4, each including a photodetector, for example, sensing optical signals at a respective one of wavelengths $\lambda_1$–$\lambda_4$. Electrical signals generated by receivers 215-1 to 215-4 in response to the received optical signals are supplied to known optical transmitters 218-1 to 218-4 (e.g., externally or directly modulated laser and associated driver circuitry), which, in turn, supply optical signals to network interface circuitry 70 for appropriate processing and/or transmission. Network interface circuitry 70 can comprise one or more data switches, a digital cross-connect switch or switches, or one or more synchronous optical network (SONET) terminals. Network interface circuit 70 can also receive optical signals from optical path segment 10 shown in FIG. 1, and supply optical signals to optical path segment 50. In addition, network interface circuit 70 supplies optical signals to receivers 217-1 to 217-4, which, in turn, output respective electrical signals for driving transmitters 216-1 to 216-4.

Figure 3:
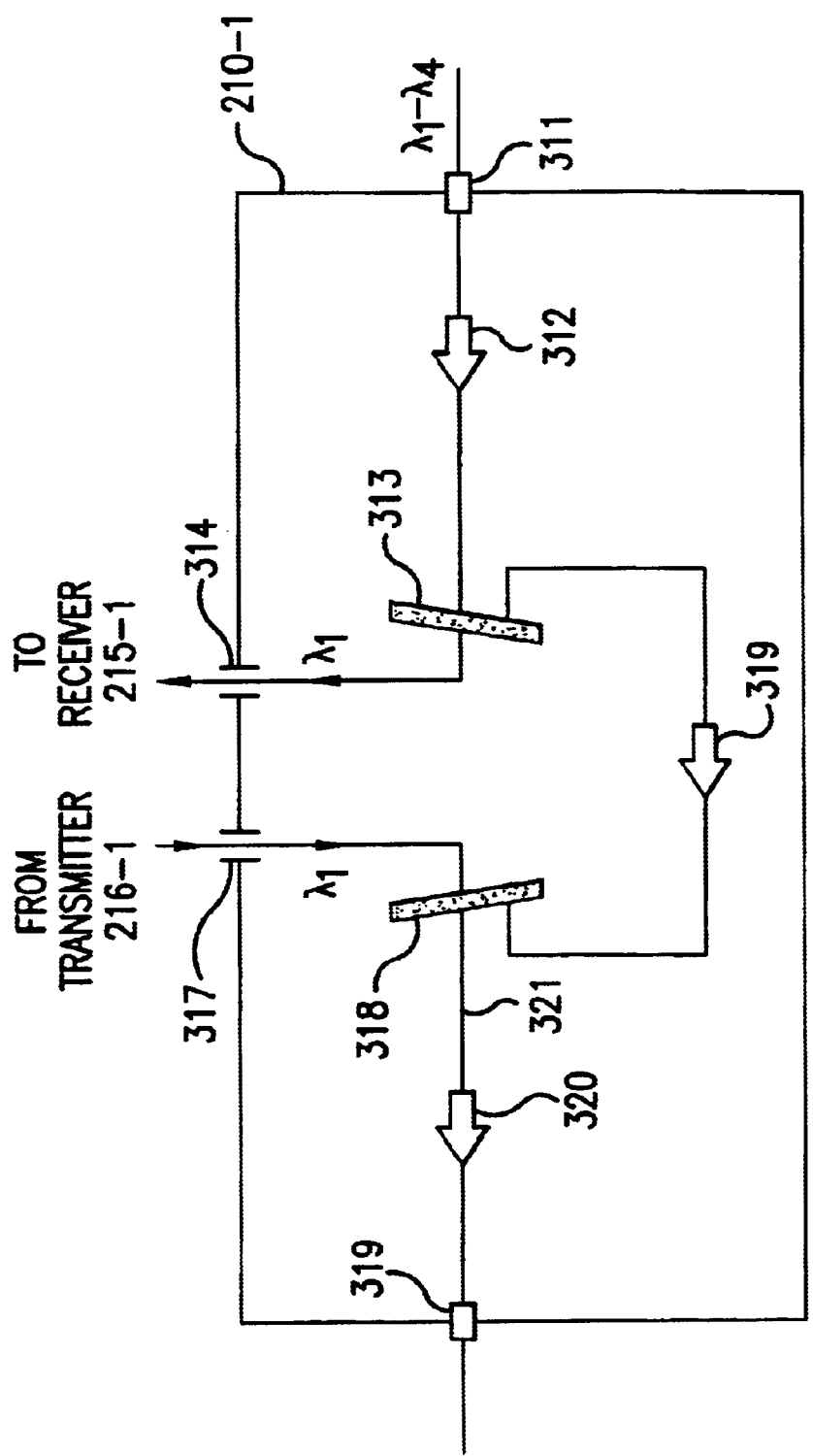
FIG. 3 illustrates an optical add/drop multiplexer.

FIG. 3 illustrates optical add/drop 210-1, for example, in greater detail, which is also described, for example, in U.S. patent application Ser. No. 08/956,807, filed Oct. 23, 1997 (which issued as U.S. Pat. No. 6,002,503 on Dec. 14, 1999) and incorporated by reference herein. Optical signals at wavelengths $\lambda_1$ to $\lambda_4$ are fed via optional connector 311 to dielectric filter 313 in a direction indicated by arrow 312. Typically, dielectric filter 313 is configured to drop or select one of wavelengths $\lambda_{1-4}$ in this example $\lambda_1$ while reflecting the remaining wavelengths, $\lambda_{2-4}$.

After passing through filter 313, the optical signal at wavelength $\lambda_1$ is input to optical receiver 215-1, as discussed above, through port 314. Optical signals emitted by transmitter 216-1 are supplied to add/drop multiplexer 210-1 through port 317 to an additional dielectric filter 318. Remaining channels at wavelengths $\lambda_{2-4}$ are reflected from filter 313 and propagate along optical line 330 in a direction indicated by arrow 319 to filter 318. Filter 318, like filter 313, is configured to pass wavelength $\lambda_1$, for example, to fiber 321 and reflect remaining wavelengths $\lambda_{2-4}$ to fiber 321. Accordingly, the channel at wavelength $\lambda_1$ is combined with the remaining channels at wavelengths $\lambda_{2-4}$, such that these channels propagate in a common direction indicated by arrow 320 through optional connector 319. Connectors 311 and 319 are typically selected from the group of commercially available FC/PC, FC/APC, SC/PC, SC/APC, biconic, ST, and Diamond E2000 connectors. Alternatively, connectors 311 and 319 can be omitted and optical connections to the add/drop element can be made with fusion splices, for example.

Returning to FIG. 1, optical signals emitted by hub 60 are passed to a first optical communication path or fiber segment 120 coupled to optical add/drop multiplexer 110 having a construction similar to that shown in FIG. 3. In addition, an optical signal at wavelength $\lambda_0$, either the same as or different than one of wavelengths $\lambda_{1-4}$ is supplied to optical communication path segment 50, which is typically time division multiplexed with data associated with segment 50 and, therefore, has the designation $\lambda_0$(DATA50) shown in FIG. 1. An optical communication path segment need not consist of a continuous optical path alone, but can include optical receivers and transmitters coupled to portions of optical fiber, for example. A plurality of TDM add/drop multiplexers such as SONET OC-12 add/drop multiplexers 50-1 to 50-4 commercially available from Positron Fiber Systems, for example, are connected in series along segment 50. A first add/drop multiplexers 50-1 extracts data within a specified time slot of signal $\lambda_0$(DATA50), and modulates signal $\lambda_0$(DATA50) within that time slot in accordance with data to be output from segment 50. Signal $\lambda_0$(DATA50) is next supplied to add/drop multiplexer 50-2, which similarly extracts data within a second time slot and further modulates signal $\lambda_0$(DATA50) within the second time slot in accordance with additional data to be output from segment 50. Add/drop multiplexers 50-3 and 50-4 likewise extract data from respective time slots of signal $\lambda_0$(DATA50), and modulate those time slots with added data.

Figure 4:
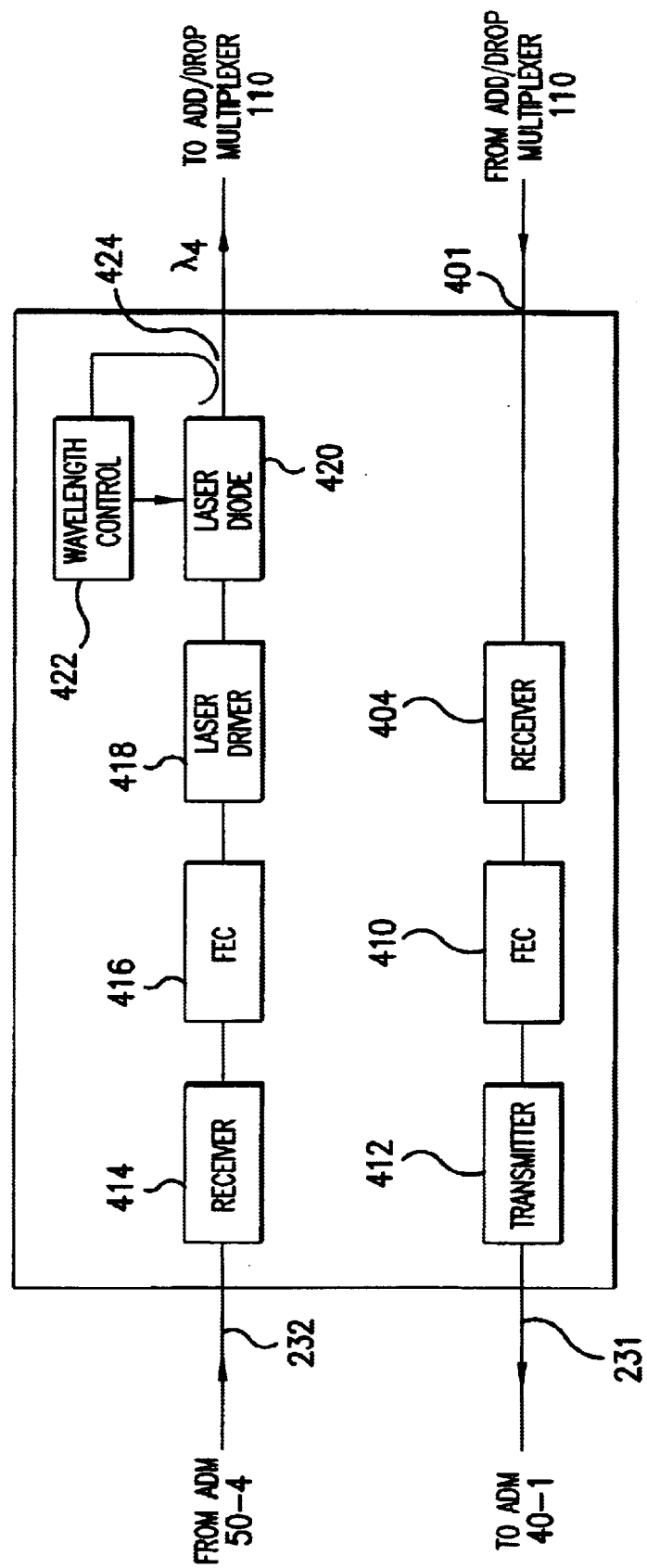
FIG. 4 illustrates a transceiver.

Add/drop multiplexer 50-4 next supplies $\lambda_0$(DATA50) to transceiver 122, which remodulates the $\lambda_0$(DATA50) at a different wavelength $\lambda_4$ for example. Transceiver 122 is shown in FIG. 4, and described in U.S. patent application Ser. No. 60/073,750, International Publication No. WO 99/40700 incorporated by reference herein. Transceiver 122 receives $\lambda_0$ optical signals output from add/drop multiplexer 50-4 via input port 232. Receiver 414 senses these optical signals and outputs electrical signals in response thereto. Optionally, the electrical signals output from receiver 414 are next encoded by FEC encoder circuit 416, as described, for example, in a U.S. patent application entitled "Remodulating Channel Selectors For WDM Optical Communication Systems" to S. B. Alexander et al., filed Oct. 21, 1997, Ser. No. 08/955,058 (which issued as U.S. Pat. No. 6,233,077 on May 15, 2001)incorporated by reference herein, which supplies encoded electrical signals to laser drive circuit 418. Laser diode 420, constituting part of optical communication path segment 50, is thus modulated by the output of laser driver 418 in accordance with the encoded electrical signals. Alternatively, laser diode 420 can be operated in a continuous wave (CW) mode and the output modulated with a Mach-Zehnder external modulator, as described, for example, in U.S. Pat. No. 5,504,609, incorporated herein by reference. Typically, a coupler 424 supplies a relatively small fraction of light output from the laser diode 420 to wavelength control circuit 422 for adjusting the temperature, and thus the wavelength of light output from laser diode 420 to be substantially equal to wavelength $\lambda_4$. The remaining light output from laser diode 420 is supplied to optical add/drop multiplexer 110. As a result, optical signal $\lambda_4$(DATA50) at wavelength $\lambda_4$ containing data associated with segment 50 is supplied to fiber segment 124 of WDM ring transmission system 100.

It should be noted that in the absence of FEC circuits 410 and 416 electrical signals generated by receivers 404 and 414 are typically supplied directly to transmitter 412 and laser driver circuit 418, respectively.

As noted above, fiber segment 120 carries optical signals at wavelengths $\lambda_1$, $\lambda_2$, $\lambda_3$, and $\lambda_4$. While propagating along fiber segment 120, these optical signals carry data associated with segments 10, 20, 30 and 40, respectively, and thus bear the designations $\lambda_1$(DATA10), $\lambda_2$(DATA20), $\lambda_3$(DATA30), and $\lambda_4$(DATA40). Optical add/drop multiplexer 110 is configured to extract optical signals at wavelength at wavelength $\lambda_4$ from fiber segment 120 and add optical signals at wavelength $\lambda_4$ to optical fiber segment 124. In addition, the extracted optical signals are supplied to optical communication path segment 40, while the added signals are input from optical communication path segment 50. Thus, optical signal $\lambda_4$(DATA40) is extracted from fiber segment 120 and supplied to transceiver 122, while optical signal $\lambda_4$(DATA50) is supplied to fiber segment 124. Optical signal $\lambda_4$(DATA50) therefore propagates along fiber segment 124 with optical signals $\lambda_1$(DATA10), $\lambda_2$(DATA20), and $\lambda_3$(DATA30).

As further shown in FIG. 4, transceiver 122 includes input port 401 receiving optical signal $\lambda_4$(DATA40). Typically, receiver 404, constituting part of optical communication path segment 40 and including a photodetector, for example, is coupled to first input port 401, which converts the received optical signal into an electrical signal. Receiver 404 further includes circuitry that performs clock and data recovery from these electrical signals. The output of receiver 404 is coupled to optional forward error correction (FEC) circuit 410 described, for example, in the patent application to S. B. Alexander et al. supra. FEC decoder circuit 410 decodes and corrects any errors present in data output from receiver 404. The output of FEC decoder circuit 410 is coupled to transmitter 412, which includes an optical emitter for outputting optical signals at wavelength $\lambda_0$ to add/drop multiplexer 40-1 of optical communication path segment 40 through port 231. FEC decoder circuit 410, however, can be omitted and the electrical signal output from receiver 404 can be supplied directly to transmitter 412.

Add/drop multiplexers 40-1 to 40-4, similar to add/drop multiplexers 50-1 to 50-4, successively extract data from and modulate optical signal $\lambda_0$(DATA40) output from transceiver 122, such that optical signal $\lambda_0$(DATA40) accumulates data along optical communication path segment 40. After propagating through optical communication path segment 40, optical signal $\lambda_0$(DATA40) is supplied to transceiver 126, which remodulates optical $\lambda_0$(DATA40) to another optical signal, $\lambda_3$(DATA40), having a different wavelength, $\lambda_3$, but carrying the same data, (DATA40). Optical signal $\lambda_3$(DATA40) is next supplied to optical add/drop multiplexer 112 and placed on fiber segment 128 with optical signals $\lambda_1$(DATA10), $\lambda_2$(DATA20), $\lambda_3$(DATA40), and $\lambda_4$(DATA50).

In a manner described above, optical signal $\lambda_3$(DATA30), is extracted by optical add/drop multiplexer 112 and output to transceiver 126 so that a corresponding optical signal at wavelength $\lambda_0$ (i.e., $\lambda_0$(DATA30) can be supplied to optical communication path segment 30. Add/drop multiplexers 30-1 through 30-4 successively modulate optical signal $\lambda_0$(DATA30), which is then output to transceiver 130. Optical signal $\lambda_2$(DATA30) carrying data associated with optical communication path segment 30 is output by transceiver 130 and supplied to fiber segment 132 via optical add/drop multiplexer 114. Optical add/drop multiplexer further extracts and supplies optical signal $\lambda_2$(DATA20) from fiber segment 128 to transceiver 130, which supplies a corresponding optical signal at wavelength $\lambda_0$ (i.e., $\lambda_0$ (DATA20)) to optical communication path segment 20.

Add/drop multiplexers 20-1 to 20-4 operate in a manner similar to that described above to output modulated optical signal $\lambda_0$(DATA20) to transceiver 134, which, in turn, outputs a corresponding optical signal $\lambda_1$(DATA20) at wavelength $\lambda_1$ to fiber segment 136 via optical add/drop multiplexer 116. Optical add/drop multiplexer 116 also extracts and supplies optical signal $\lambda_1$(DATA10) from fiber segment 132 to transceiver 134. Transceiver 134 next outputs a corresponding optical signal $\lambda_0$(DATA10) to optical communication path segment 10 comprising add/drop multiplexers 10-1 to 10-4. Add/drop multiplexers 10-1 to 10-4 operate in a manner similar to that described above to output optical signal $\lambda_0$(DATA10) to a receiver within network interface circuit 70. In addition, optical signals $\lambda_1$(DATA20), $\lambda_2$(DATA30), $\lambda_3$(DATA40), and $\lambda_4$(DATA50) carried by fiber segment 136 are supplied to hub 60, which, in turn, separates and converts the optical signals to electrical signals, and back again to optical signals at the same or different wavelengths using transmitters 218-1 to 218-4. The optical signals emitted by transmitters 218-1 to 218-4 are received by interface circuit 70 and converted to electrical signals, as noted above, for further appropriate processing and/or transmission.

In the first embodiment described above, each fiber segment 120, 124, 128, 132 and 136 carry the same wavelengths, but the wavelengths can carry different data over different fiber segments of WDM ring transmission system 110. In accordance with a second embodiment of the present invention, however, each wavelength carries data associated with a corresponding one of the add/drop multiplexer groups (e.g., add/drop multiplexers 40-1 to 40-4).

For example, as shown in FIG. 5, a WDM ring transmission system 500 in accordance with the second embodiment includes substantially the same components as those included in the first embodiment illustrated in FIG. 1. However, transmitters provided in network interface circuit 70, as well as transceivers 122, 126, 130 and 134 emit optical signals having wavelengths associated with a particular group of add/drop multiplexers. Accordingly, as shown in FIG. 5, optical signals at wavelength $\lambda_2$ (i.e., optical signal $\lambda_2$(DATA40)) carry data associated with add/drop multiplexers 40-1 to 40-4 coupled to optical communication path segment 40. Likewise, optical signals $\lambda_1$ (DATA50), $\lambda_3$ (DATA30), $\lambda_4$ (DATA20), and $\lambda_5$ (DATA10) at wavelengths wavelength $\lambda_1$, $\lambda_3$, $\lambda_4$ and $\lambda_5$ carry data associated with add/drop multiplexers coupled to optical communication path segments 50, 30, 20 and 10, respectively. Although the embodiment shown in FIG. 5 simplifies wavelength assignment, it comes at the cost of having an extra wavelength (e.g., $\lambda_5$), and requires that optical add/drop multiplexers in hub 60 as well as optical add/drop multiplexers 110, 112, 114 and 116 add and drop optical signals at different wavelengths.

While the foregoing invention has been described in terms of the embodiments discussed above, numerous variations are possible. Accordingly, modifications and changes such as those suggested above, but not limited thereto, are considered to be within the scope of the following claims. For example, although single fiber segments are described above, each segment 120, 124, 128, 132 and 136 can comprise a fiber pair, carrying optical signals propagating in opposite directions. Moreover, add/drop multiplexers in optical communication path segments 10, 20, 30, 40 and 50 can be configured to accommodate optical signal propagating in opposite directions as well. In addition, optical add/drop multiplexers can replace the TDM add/drop multiplexers coupled to optical communication path segments 10, 20, 30, 40 and 50. Further, although a four wavelength WDM ring has been described above, the present invention is not limited to this number of wavelengths. Rather, the present invention encompasses any suitable number of wavelengths.

What is claimed is:

1. A communication method, comprising the steps of:
   transmitting a plurality of first optical signals along a first optical communication path segment, each of said plurality of first optical signals being at a respective one of a plurality of wavelengths;
   extracting one of the wavelengths corresponding to one of said plurality of first optical signals from said first optical communication path segment;

supplying a second optical signal to a second optical communication path segment in response to said one of the wavelengths corresponding to one of said plurality of first optical signals extracted by said extracting step; and successively extracting data constituting respective portions of information carried by said second optical signal at a plurality of locations provided along said second optical communication path segment.

2. A method in accordance with claim 1, wherein said one of the wavelengths of said plurality of first optical signals is different than a wavelength of said second optical signal.

3. A method in accordance with claim 1, wherein said one of the wavelengths of said plurality of first optical signals is substantially the same as a wavelength of said second optical signal.

4. A communication method, comprising the steps of:

successively modulating first optical signals each of the first optical signals being successively modulated at one of a plurality of groups of locations along a first optical communication path;

supplying a plurality of second optical signals each at a respective one of a plurality of wavelengths to a second optical communication path each of the second optical signals being derived from a respective one of said successively modulated first optical signals; and supplying a plurality of additional optical signals to said second optical communication path, each of said second optical signals and said additional plurality of optical signals being at a respective one of a plurality of wavelengths.

5. A communication method, comprising the steps of:

supplying a plurality of first optical signals to a first optical communication path segment, each of said plurality of first optical signals being at a respective one of a plurality of wavelengths;

successively modulating a second optical signal at a plurality of locations along a second optical communication path segment, said second optical signal being successively modulated in accordance with first data associated with said plurality of locations;

extracting one of said plurality of first optical signals from said first optical communication path segment, said one of said plurality of first optical signals carrying second data;

passing remaining ones of said plurality of first optical signals from said first optical communication path segment to a third optical communication path segment;

adding a third optical signal to said third optical communication path segment, the third optical signal being derived from said second optical signal from the second optical communication path segment; and supplying a fourth optical signal to a fourth optical communication path segment in response to said extracted one of said plurality of first optical signals.

6. A method in accordance with claim 5, further comprising the step of sensing portions of data carried by said fourth optical signal at respective locations along said fourth optical communication path.

7. A method in accordance with claim 5, wherein a wavelength of said one of said plurality of first optical signals and a wavelength of said third optical signal are substantially the same.

8. A method in accordance with claim 5, wherein a wavelength of said one of said plurality of first optical signals and a wavelength of said third optical signal are different.

9. A method in accordance with claim 5, wherein said first and third optical communication paths constitute portions of a looped optical communication path.

10. A method in accordance with claim 5, wherein said second and fourth optical communication paths constitute portions of a looped optical communication path.

* * * * *